(12) United States Patent
Berube et al.

(10) Patent No.: US 11,906,071 B1
(45) Date of Patent: Feb. 20, 2024

(54) REMOTE PASSIVELY AND ACTIVELY ACTUATED VALVE SYSTEMS

(71) Applicant: Hamilton Sundstrand Corporation, Charlotte, NC (US)

(72) Inventors: Connor Berube, York Beach, ME (US); Myles R. Kelly, Willimantic, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/822,741

(22) Filed: Aug. 26, 2022

(51) Int. Cl.
*F16K 31/163* (2006.01)
*F16K 15/06* (2006.01)
*F16K 15/18* (2006.01)

(52) U.S. Cl.
CPC ............ *F16K 31/163* (2013.01); *F16K 15/06* (2013.01); *F16K 15/184* (2021.08); *Y10T 137/7762* (2015.04)

(58) Field of Classification Search
CPC . F16K 1/12; F16K 1/123; F16K 1/126; Y10T 137/777; Y10T 137/7762; Y10T 137/3367; Y10T 137/3421
See application file for complete search history.

(56) References Cited

U.S. PATENT DOCUMENTS

| | | | |
|---|---|---|---|
| 3,769,998 A * | 11/1973 | Avant | F16K 31/365 137/487 |
| 4,320,872 A * | 3/1982 | Frederick | B64D 15/04 236/80 C |
| 4,617,958 A * | 10/1986 | Seidel | G05D 16/2095 137/488 |
| 6,520,205 B1 | 2/2003 | Sowards et al. | |
| 8,814,498 B2 | 8/2014 | Goodman et al. | |
| 9,689,315 B2 | 6/2017 | Marocchini et al. | |
| 10,267,430 B2 * | 4/2019 | Simpson | F02C 9/18 |
| 10,619,757 B2 * | 4/2020 | Thybo | F16K 31/1245 |
| 10,865,715 B2 | 12/2020 | Greenberg et al. | |
| 10,865,800 B2 * | 12/2020 | Caratge | F02C 6/08 |
| 11,346,356 B2 | 5/2022 | DeFelice et al. | |
| 2003/0192595 A1* | 10/2003 | Benson | G05D 7/005 137/488 |
| 2018/0223738 A1* | 8/2018 | Greenberg | F02C 7/277 |

FOREIGN PATENT DOCUMENTS

EP 3358233 A1 8/2018

* cited by examiner

*Primary Examiner* — Robert K Arundale
(74) *Attorney, Agent, or Firm* — Locke Lord LLP; Joshua L. Jones; Gabrielle L. Gelozin

(57) ABSTRACT

In accordance with at least one aspect of this disclosure, a system includes, a first moveable member disposed in a first chamber configured to move between a first position and a second position of the first moveable member to allow or prevent fluid from passing from an inlet of the first chamber to an outlet of the first chamber. A second moveable member is disposed in a second chamber configured to move between a first position and a second position of the second moveable member to allow or prevent fluid from entering a biasing chamber, the second chamber being fluidly connected to the first chamber.

19 Claims, 5 Drawing Sheets

REMOTE PASSIVELY AND ACTIVELY ACTUATED VALVE SYSTEMS

TECHNICAL FIELD

The present application relates to valve systems, and more particularly to remote passively and actively actuated valve systems having a relay valve.

BACKGROUND

Typically, electronically controllable valves (e.g., solenoid valves) are used to control flow through a valve system, for example in an engine system. However, if the controllable valve fails or otherwise is inoperative, there is no way to maintain the valve system in a given position.

Therefore, there remains a need in the art, e.g., in the aerospace industry, for improvements to actively actuated valve systems actuated with an electronically commanded valve. This disclosure provides a solution for this need.

SUMMARY

In accordance with at least one aspect of this disclosure, a system includes, a first moveable member disposed in a first chamber configured to move between a first position and a second position of the first moveable member to allow or prevent fluid from passing from an inlet of the first chamber to an outlet of the first chamber. A second moveable member is disposed in a second chamber configured to move between a first position and a second position of the second moveable member to allow or prevent fluid from entering a biasing chamber, the second chamber being fluidly connected to the first chamber. In embodiments, the first chamber can be fluidly connected to the second chamber via a fluid tube.

A first biasing member can be disposed on a first side of the second movable member configured to bias the second moveable member to the first position of the second moveable member to prevent fluid from entering the biasing chamber. A third moveable member can be disposed in the biasing chamber and operatively connected to the first moveable member via a mechanical linkage, the third moveable member configured to move between a first position and a second position of the third moveable member. A second biasing member can be disposed on a first side of the third moveable member configured to bias the third moveable member to the first position of the third moveable member and the first position of the first moveable member to allow to pass from an inlet of the first chamber to an outlet of the first chamber.

In embodiments, a stabilizer guide can be disposed at the outlet of the first chamber configured to guide the first moveable member between the first position and the second position of the first moveable member. In certain embodiments, the stabilizer guide can include a tri-foil guide, wherein the stabilizer guide does not impede flow through the outlet of the first chamber when the first moveable member is in the first position.

In embodiments, the second moveable member can be configured to move from the first position to the second position of the second moveable member when a pressure of fluid in the first chamber exceeds a predetermined biasing force of the first biasing member.

The system can further include a shuttle valve disposed in a shuttle chamber configured to move between a first position and a second position of the shuttle valve, the shuttle chamber fluidly connected to the biasing chamber. In the second position of the second moveable member, the shuttle valve can be in a first position of the shuttle valve and such that fluid is allowed to enter the biasing chamber on a second side of the third moveable member to move the third moveable member to the second position of the third moveable member. In the second position of the third moveable member, the mechanical linkage can be configured to move the first moveable member to the second position of the first moveable member to prevent fluid from the first chamber from passing through the outlet of the first chamber.

In embodiments, the system can also include an electronically controllable valve having a first state and a second state, operatively connected to provide fluid to the shuttle chamber in the first state of the electronically controllable valve. In such embodiments, the first moveable member, the second moveable member, and the third moveable member can be configured to move between respective first and second positions to bias the first moveable member to the first position of the first moveable member regardless of a state of the electronically controllable valve.

In embodiments, the electronically controllable valve can include a solenoid valve, and the first state can be a de-energized state and the second state can be an energized state. In embodiments, when the solenoid valve is in the de-energized state, fluid is prevented from entering the shuttle chamber and the shuttle valve is in the first position of the shuttle valve. In embodiments, when the solenoid valve is in the energized state, fluid is allowed to enter the shuttle chamber to move the shuttle valve to the second position of the shuttle valve and fluid is allowed to enter the biasing chamber.

In certain embodiments, the system can further include a vent fluidly connected to the shuttle chamber to allow the shuttle chamber to vent to ambient when the solenoid is de-energized and the shuttle valve is in the first position of the shuttle valve.

In certain embodiments, the mechanical linkage can include a three member cantilevered mechanical linkage. In certain embodiments, the three member cantilevered mechanical linkage includes a first link, a second link, and a rocker. A first side of the three member mechanical linkage is mechanically connected to the first moveable member via the first link and a second side of the three member mechanical linkage is mechanically connected to the third moveable member via the second link. The rocker can be disposed between the first link and the second link configured to rock about a pivot.

In embodiments, the system can further include a first fluid line configured to provide compressor bleed air from a compressor to ambient via the first chamber. The valve system can be disposed in the first chamber of the first fluid line to selectively control a flow of the bleed air to ambient based on a position of the first, second, and third moveable members. A second fluid line can be selectively fluidly connected to the biasing chamber configured to provide a secondary fluid to the biasing chamber in the second position of the second moveable member. In embodiments, the electronically controllable valve can be disposed in the second fluid line configured to selectively provided fluid to the shuttle chamber of the valve system to move the shuttle valve from a first position to a second position to allow fluid from the second line to enter the biasing chamber. In embodiments, the pressure of the compressor bleed air is dependent on a speed of the engine and the pressure of the secondary fluid is a constant pressure such that movement of the second moveable member is dependent on the pressure of the compressor bleed air against the first biasing member.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
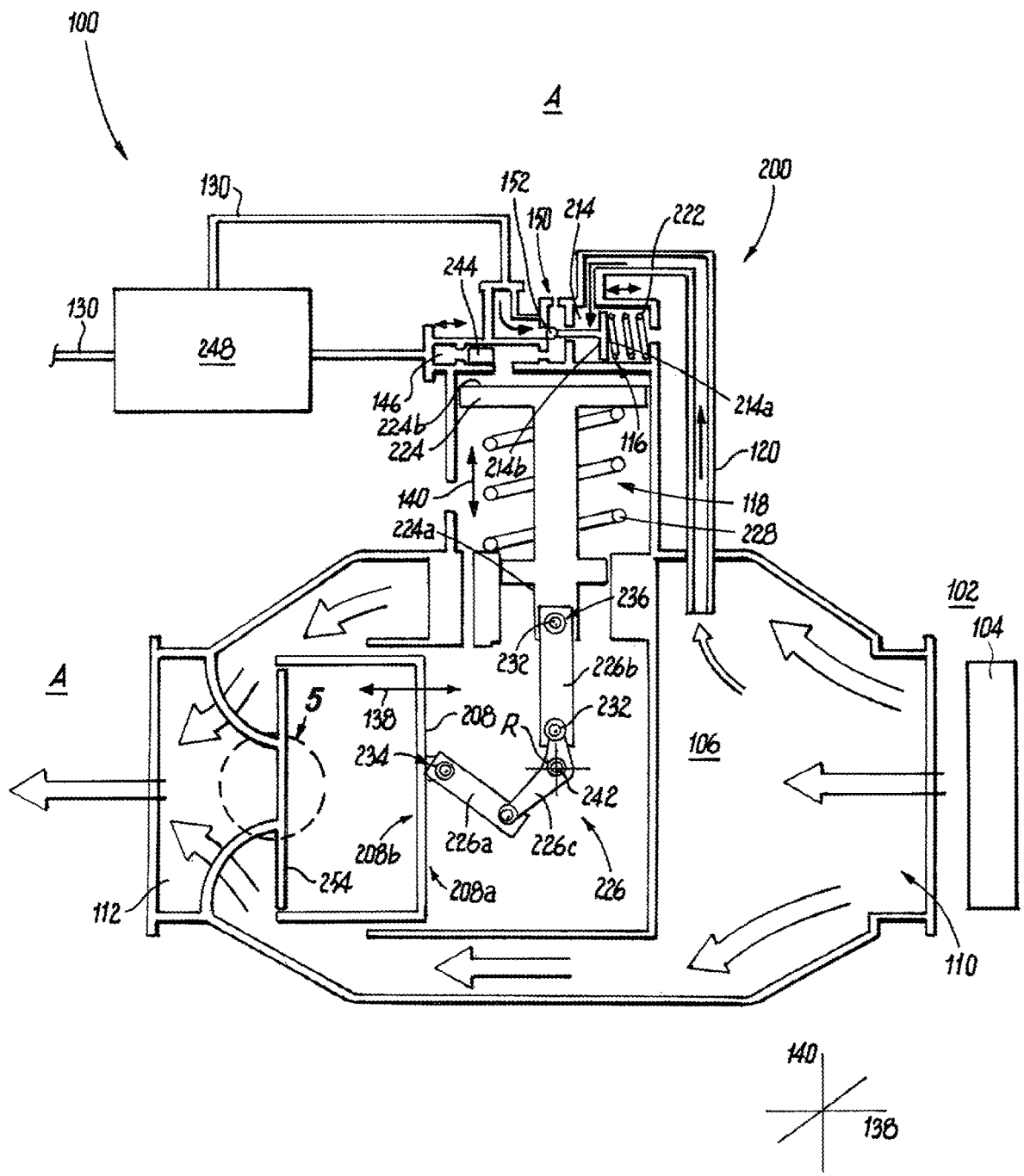
FIG. 1 is a schematic cross-sectional view of a system in accordance with this disclosure, showing a valve system in a first condition.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-5.

In accordance with at least one aspect of this disclosure, a system 100 includes a redundant valve system 200 that will failsafe to a desired position during various stages of an engine flight profile. In embodiments, the system 100 can include a first fluid line 102 configured to provide compressor bleed air from a compressor 104 to ambient A via a first chamber 106. The valve system 200 can be disposed in the first chamber 106 of the first fluid line 102 to selectively control a flow of the bleed air to ambient based on a position of one or more moveable members of the valve system 200.

One of the moveable members of the valve system 200 can include a first moveable member 208 (e.g., a piston) having a first side 208a and a second side 208b. The first moveable member 208 can be disposed in the first chamber 106 configured to move between a first position and a second position to allow or prevent fluid from passing from an inlet 110 of the first chamber 106 to an outlet 112 of the first chamber 106 (e.g., from the compressor to ambient). Another of the moveable members of the valve system 200 can include a second moveable member 214 (e.g., a piston) having a first side 214a and a second side 214b. The second moveable member 214 can be disposed in a second chamber 116 configured to move between a first position and a second position to allow or prevent fluid from entering a biasing chamber 118. The second chamber 116 can be fluidly connected to the first chamber 106 via a tap, such as a fluid tube 120 as shown.

A first biasing member 222 can be disposed on the first side 214a of the second movable member 214 to bias the second moveable member 214 to its first positon to prevent fluid from entering the biasing chamber 118. Another moveable member of the valve system 200 can include a third moveable member 224 (e.g., a piston) having a first side 224a and a second side 224b. The third moveable member 224 can be disposed in the biasing chamber 224 and operatively connected to the first moveable member 208 via a mechanical linkage 226. The third moveable member 224 can be configured to move between a first position and a second position. A second biasing member 228 can be disposed on the first side 224a of the third moveable member 224 configured to bias the third moveable member 224 to its first position and to hold the first moveable member 208 in its first position to allow to pass from an inlet of the first chamber to an outlet of the first chamber. In this state, when each moveable member is in its first position, the valve system is open so that the compressor bleed air can vent through the first chamber to ambient.

A second fluid line 130 can be fluidly connected to the biasing chamber 118 configured to provide a secondary fluid (e.g., air from an auxiliary power unit) to the biasing chamber 118 in the second position of the second moveable member 214. In embodiments, the second moveable member 214 can be configured to move from its first position to its second positon when a pressure of fluid in the first chamber 106 (e.g., the compressor bleed pressure) exceeds a predetermined biasing force of the first biasing member 222. The first biasing member 222 can be tuned as needed to deliver a desired biasing force for a given application or engine.

When the pressure in the first chamber 106 exceeds the biasing force of the first biasing member 222, the second moveable member 214 moves to its second position and the secondary fluid is allowed to enter the biasing chamber 118 to move the third moveable member 224 to its second position. In the second position of the third moveable member 224, the mechanical linkage 226 is configured to move the first moveable member 208 to its second position to prevent fluid from the first chamber 106 from passing through the outlet 112 of the first chamber 106. When each of the first, second, and third moveable members 208, 214, 224 are in respective second positions, the valve system 200 is closed.

In certain embodiments, e.g., as shown, the mechanical linkage 226 can include a three member cantilevered mechanical linkage. The linkage 226 can include a first link 226a, a second link 226b, and a rocker 226c operatively coupled to one another by one or more pins 232. A first side 234 of the linkage 226 can be mechanically connected to the first side 208a of the first moveable member 208 via the first link 226a and a second side 236 of the linkage 226 can be mechanically connected to the first side 224a of the third moveable member 224 via the second link 226b. The first and second links 226a,b can be connected to the first and third moveable members 208, 224 to rotate relative to the first and third moveable members 208, 224 about a rotational axis R perpendicular to a direction of movement 138, 148 of both the first and third moveable members 208, 224. The rocker 226c can be disposed between the first link 226a and the second link 226b configured to rock about a rocking point 242 as the first and third moveable members 208, 224 move between their respective first and second positions.

Figure 2:
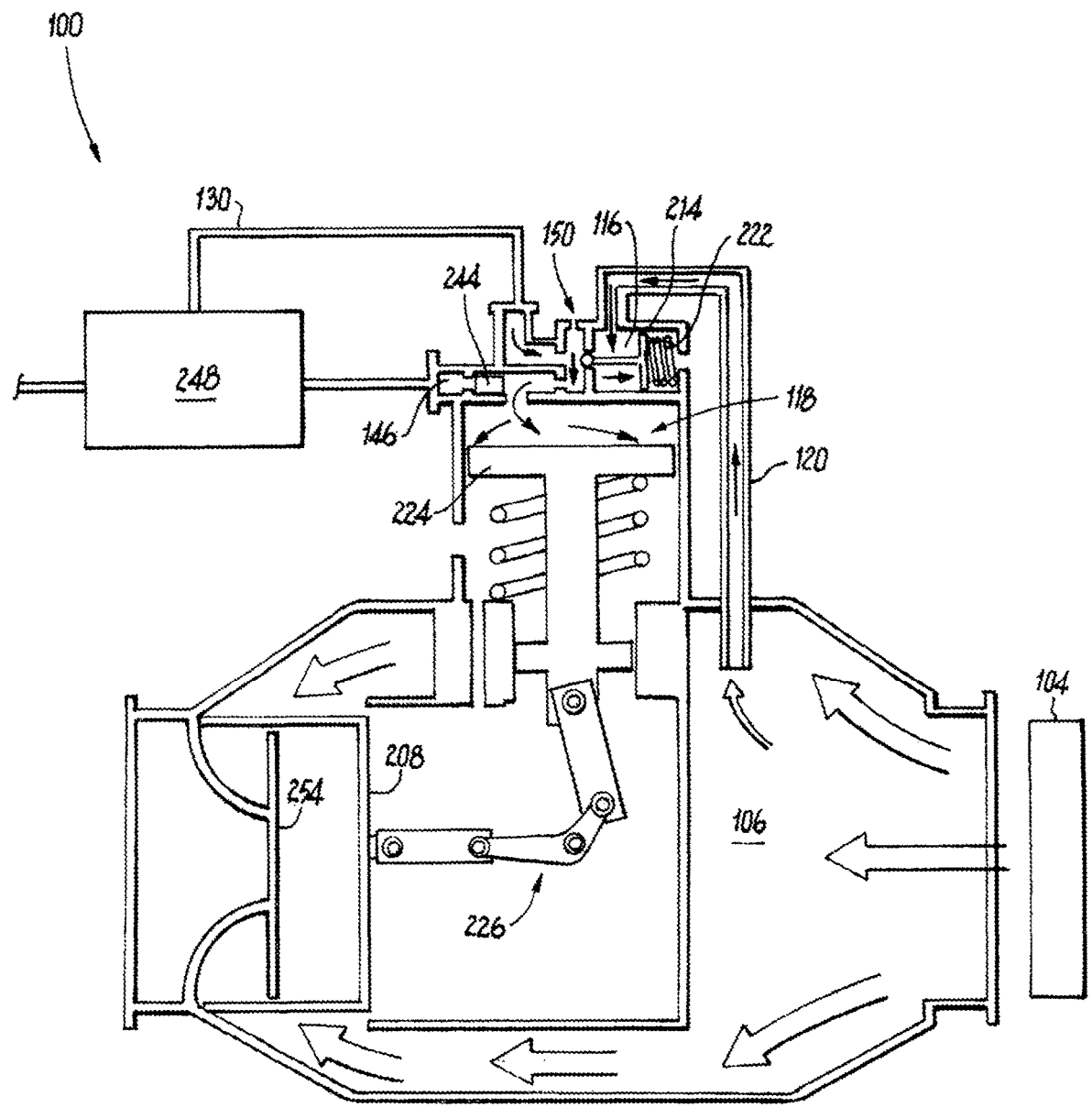
FIG. 2 is a schematic cross-sectional view of the system of FIG. 1, showing the valve system in a second condition, wherein the valve system is actuated passively.

Referring specifically to FIGS. 1 and 2 as an example, when the pressure in the first chamber 106 is low such that it does not exceed the biasing force of the first biasing member 222 in the second chamber 116, the second moveable member 214 remains in its first position (e.g., fully to the left in the second chamber 116) and blocks secondary flow from entering the biasing chamber 118. Without the secondary flow pressing on second side 224b of the third moveable member 224, the third moveable member 224 stays in its first positon (e.g., fully up in the biasing chamber 118), biasing the first moveable member 208 to its first positon (e.g., to the right) and holding the valve system 200 open so compressor bleed air can flow to ambient, as shown in FIG. 1.

Still with reference to FIGS. 1 and 2, when the pressure in the first chamber 106 rises to the point of exceeding the biasing force of the first biasing member 222, the higher pressure fluid on the second side 214b of the second moveable member 214 forces the second moveable member 214 to its second positon (e.g., to the right in the second chamber 116). This allows the secondary fluid to enter and flood the biasing chamber 118 to act on the third moveable member 224. Pressure acting on the second side 224b of the third moveable member 224 moves the third moveable member 224 downward against the second biasing member 228 to its second positon. The downward movement of the third moveable member 224 moves the first moveable member 208 to its second positon via the mechanical linkage 226. Now, the valve system 200 is closed and no compressor bleed air is passes to ambient via the first chamber, as shown in FIG. 2.

In embodiments, the valve system 200 can further include a shuttle valve 244 disposed in a shuttle chamber 146 configured to move between a first position and a second position, the shuttle chamber fluidly connected to the biasing chamber 118. When the second moveable member 214 is in its second positon and secondary flow is in the biasing chamber 118, the secondary flow forces the shuttle valve 244 to its first position (e.g., to the left in FIGS. 1 and 2).

In embodiments, the system can also include an electronically controllable valve 248 having a first state and a second state, disposed in the second fluid line 130 operatively connected to provide fluid to the shuttle chamber 146 in the first state of the electronically controllable valve 248. The valve system 200 can be configured to be operated actively, e.g., using the electronically controllable valve 248, or, in the event of a failure of the electronically controllable valve 248, the valve system 200 is configured to operate passively, such that the first moveable member 208, the second moveable member 214, and the third moveable member 224 can be configured to move between respective first and second positions to bias the first moveable member 208 to its first position regardless of a state of the electronically controllable valve 248.

Figure 3:
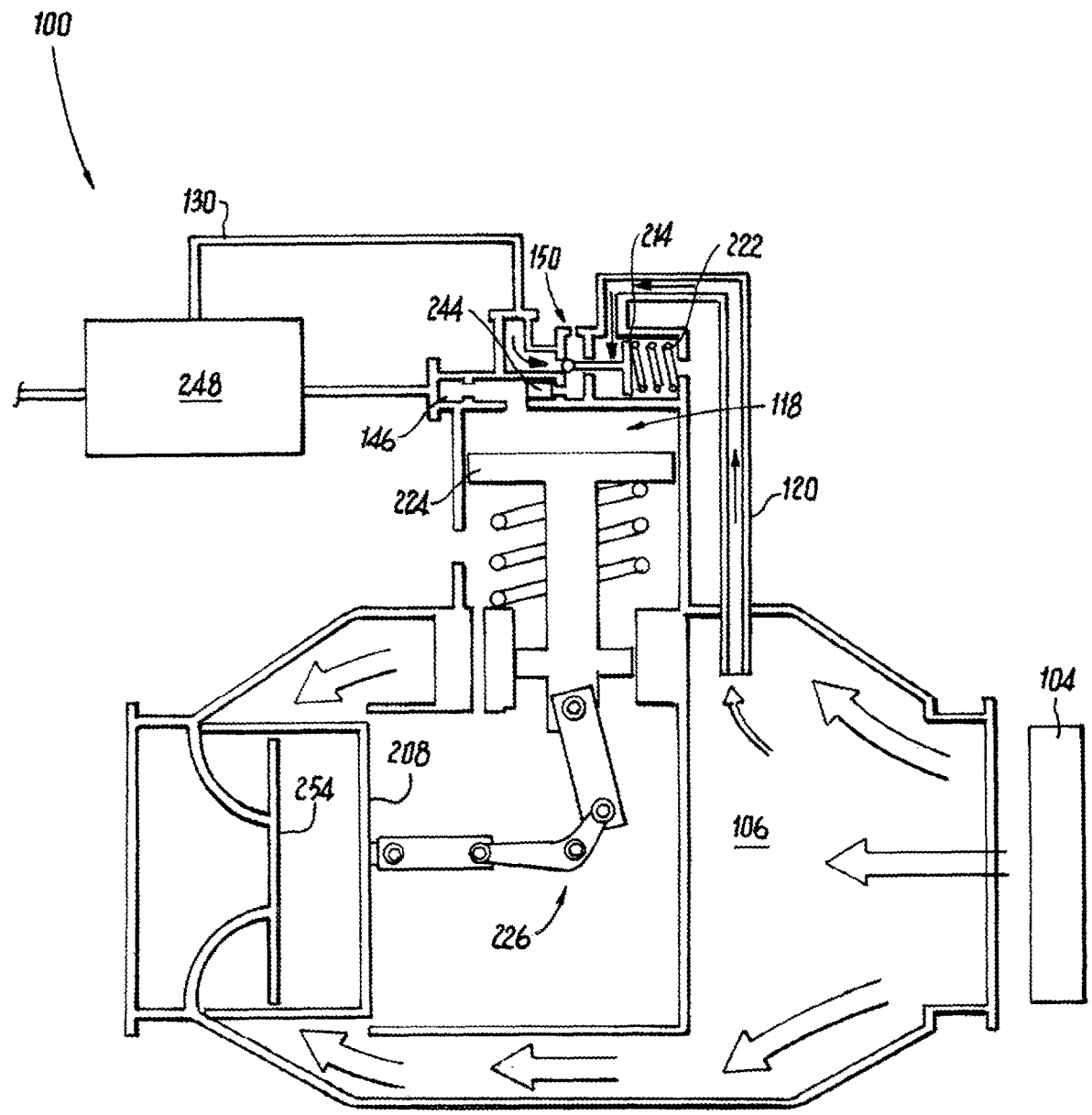
FIG. 3 is a schematic cross-sectional view of the system of FIG. 1, showing the valve system in a third condition state, wherein the valve system is actuated actively.
Figure 4:
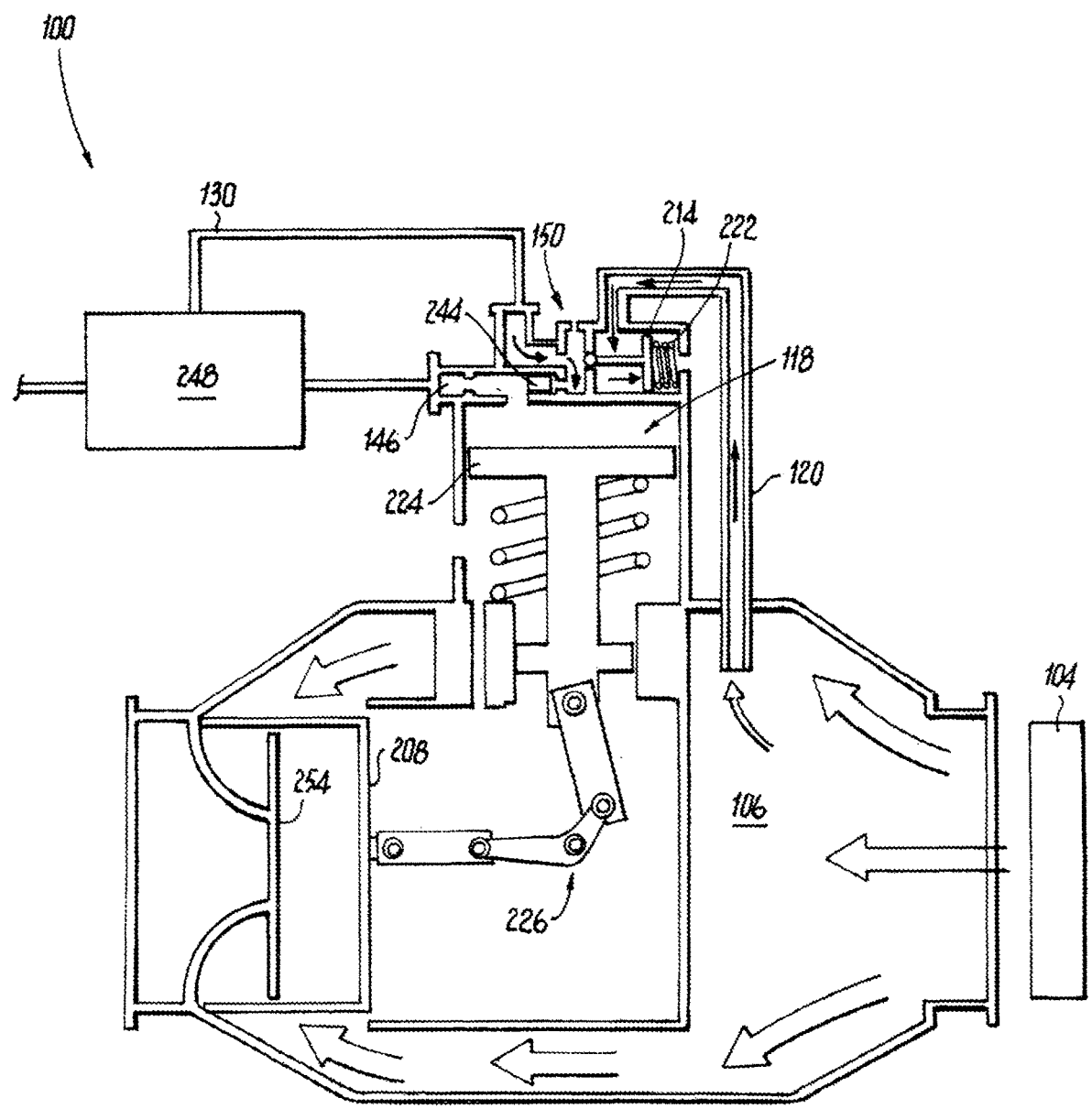
FIG. 4 is a schematic cross-sectional view of the system of FIG. 1, showing the valve system in a fourth condition, wherein the valve system is actuated actively.

This can be seen in FIGS. 1-4. In FIG. 1, the electronically controllable valve 248 is in a first state, e.g., an off state so that no secondary fluid is provided to the shuttle chamber 146 via the electronically controllable valve 248. But as shown in FIG. 2, the increases in pressure in the first chamber 106 will move the first moveable member 208 to its second position to close the valve 200 (e.g., as described above) even with the electronically controllable valve 248 in the off state. Turning to FIG. 3, the electronically controllable valve 248 has been placed in its second state, its on state. Here, pressure in the first chamber 106 does not exceed the biasing force of the first biasing member 222, but the flow of secondary fluid through the electronically controllable valve 248 forces the shuttle valve 244 to its second positon (e.g., to the right) and the secondary fluid can flood the biasing chamber 118 to move the third moveable member 224 to its second position and ultimately close the valve 200 by moving the first moveable member 208 to its second position via the linkage 226. In FIG. 4, when the electronically controllable valve 248 is still in its open position, even if the pressure in the first chamber 106 rises to the level of overcoming the biasing force of the biasing member 222, the electronically controllable valve 248 is still in control of the position of the first moveable member 208, and the valve system 200 remains closed. A vent 150 is fluidly connected to the shuttle chamber 146 to allow a back end 152 of the shuttle chamber 146 to vent to ambient A in this condition. Accordingly, regardless of whether the electronically controllable valve 248 is in its on state or off state, the moveable members 208, 214, 224 are able to operate passively in the event of an active control failure.

In embodiments, the electronically controllable valve 248 can include a solenoid valve, and the first state can be a de-energized state and the second state can be an energized state. In embodiments, when the solenoid valve 248 is in the de-energized state, fluid is prevented from entering the shuttle chamber 146 and the shuttle valve 244 is in its first positon (e.g., the solenoid valve 248 is closed and the valve system 200 operates passively to close the valve system under high pressure). In embodiments, when the solenoid valve 248 is in the energized state, fluid is allowed to enter the shuttle chamber 146 to move the shuttle valve 244 to its second positon and fluid is allowed to enter the biasing chamber 118 (e.g., the solenoid valve 248 is open and the valve system 200 is actively commanded to close the valve system 200 regardless of pressure in the first chamber 106).

Figure 5:
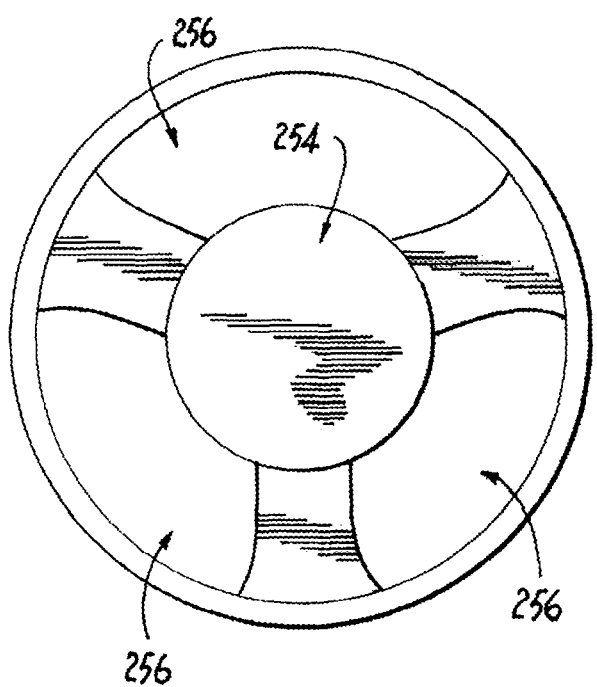
FIG. 5 is a schematic front end view of a portion of the valve system.

In embodiments, the pressure of the compressor bleed air (e.g., the pressure in the first chamber 106) is dependent on a speed of the engine while the pressure of the secondary fluid in the secondary fluid line 130 is a constant pressure. Thus, movement of the second moveable member 214 is dependent on the pressure of the compressor bleed air against the first biasing member 222, rather than the pressure of the secondary fluid. In embodiments, a stabilizer guide can 254 be disposed at the outlet 112 of the first chamber 106 configured to guide the first moveable member 208 between its first and second positons. In certain embodiments, as shown in FIG. 5, the stabilizer guide 254 can include a tri-foil guide having openings 256 so as not impede flow through the outlet 112 of the first chamber 106 when the first moveable member 208 is in its first position (e.g., when the valve system 200 is open).

Embodiments include a system that can electrically failsafe to a first position (e.g., bias towards an open position) at low power during engine start. The valve system can failsafe to a second position (e.g., move to a closed position) at high power engine conditions to prevent economic damage to downstream components caused by high temperature/pressure airflow. Embodiments include a failsafe, redundant design that can help to reduce the probability of the valve being in an undesired position. Embodiments allow for sizing the actuators (e.g., moveable members) without modifying the size of the valve body. Embodiments include cantilever mechanical linkage to utilize mechanical advantage to increase gate stroke versus the actuator piston stroke.

Embodiments can include a spring loaded open sleeve valve that uses inlet pressure to passively actuate towards the closed position at a target pressure. In embodiments, the valve can also have the capability to be actively closed by an electrical solenoid that controls muscle pressure. Embodiments include a cantilever linkage and relay that uses mechanical advantage to increase gate stroke or increase force margin. In embodiments, the passive operation can be tuned such that inlet pressure at a predetermined psi would passively actuate the upper piston, overcoming the spring force and allowing the muscle fluid to flow into the lower cavity, actuating the piston to close. In the active operation, the solenoid will be energized to provide closing muscle pressure before the passive actuation point, closing and preventing flow.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A system, comprising:
   a first moveable member disposed in a first chamber configured to move between a first position and a second position of the first moveable member to allow or prevent fluid from passing from an inlet of the first chamber to an outlet of the first chamber;
   a second moveable member disposed in a second chamber configured to move between a first position and a second position of the second moveable member to allow or prevent fluid from entering a biasing chamber, the second chamber fluidly connected to the first chamber;
   a first biasing member disposed on a first side of the second movable member configured to bias the second moveable member to the first position of the second moveable member to prevent fluid from entering the biasing chamber;
   a third moveable member disposed in the biasing chamber and operatively connected to the first moveable member via a mechanical linkage, the third moveable member configured to move between a first position and a second position of the third moveable member;
   a second biasing member disposed on a first side of the third moveable member configured to bias the third moveable member to the first position of the third moveable member and the first position of the first moveable member to allow fluid to pass from the inlet of the first chamber to the outlet of the first chamber, wherein the second moveable member is configured to move from the first position to the second position of the second moveable member when a pressure of fluid in the first chamber exceeds a predetermined biasing force of the first biasing member; and
   a shuttle valve disposed in a shuttle chamber configured to move between a first position and a second position of the shuttle valve, the shuttle chamber fluidly connected to the biasing chamber, wherein in the second position of the second moveable member, the shuttle valve is in a first position of the shuttle valve and fluid is allowed to enter the biasing chamber on a second side of the third moveable member to move the third moveable member to the second position of the third moveable member.

2. The system of claim 1, further comprising a stabilizer guide disposed at the outlet of the first chamber configured to guide the first moveable member between the first position and the second position of the first moveable member.

3. The system of claim 2, wherein the stabilizer guide includes a tri-foil guide.

4. The system of claim 1, wherein in the second position of the third moveable member, the mechanical linkage is configured to move the first moveable member to the second position of the first moveable member to prevent fluid from the first chamber from passing through the outlet of the first chamber.

5. The system of claim 4, further comprising an electronically controllable valve having a first state and a second state, operatively connected to provide fluid to the shuttle chamber in the first state of the electronically controllable valve.

6. The system of claim 5, wherein the first moveable member, the second moveable member, and the third moveable member are configured to move between respective first and second positions to bias the first moveable member to the first position of the first moveable member regardless of a state of the electronically controllable valve.

7. The system of claim 5, wherein the electronically controllable valve includes a solenoid valve, wherein the first state is a de-energized state and the second state is an energized state, wherein when the solenoid valve is in the de-energized state, fluid is prevented from entering the shuttle chamber and the shuttle valve is in the first position of the shuttle valve.

8. The system of claim 7, wherein when the solenoid valve is in the energized state, fluid is allowed to enter the shuttle chamber to move the shuttle valve to the second position of the shuttle valve and fluid is allowed to enter the biasing chamber.

9. The system of claim 8, further comprising a vent fluidly connected to the shuttle chamber to allow the shuttle chamber to vent to ambient when the solenoid is de-energized and the shuttle valve is in the first position of the shuttle valve.

10. The system of claim 1, wherein the mechanical linkage includes a three member cantilevered mechanical linkage.

11. The system of claim 10, wherein three member cantilevered mechanical linkage includes a first link, a second link, and a rocker, wherein a first side of the three member mechanical linkage is mechanically connected to the first moveable member via the first link and a second side of the three member mechanical linkage is mechanically connected to the third moveable member via the second link, wherein the rocker is disposed between the first link and the second link.

12. The system of claim 1, wherein the first chamber is fluidly connected to the second chamber via a fluid tube.

13. A system, comprising:
a first moveable member disposed in a first chamber configured to move between a first position and a second position of the first moveable member to allow or prevent fluid from passing from an inlet of the first chamber to an outlet of the first chamber;
a second moveable member disposed in a second chamber configured to move between a first position and a second position of the second moveable member to allow or prevent fluid from entering a biasing chamber, the second chamber fluidly connected to the first chamber;
a first biasing member disposed on a first side of the second movable member configured to bias the second moveable member to the first position of the second moveable member to prevent fluid from entering the biasing chamber;
a third moveable member disposed in the biasing chamber and operatively connected to the first moveable member via a mechanical linkage, the third moveable member configured to move between a first position and a second position of the third moveable member;
a second biasing member disposed on a first side of the third moveable member configured to bias the third moveable member to the first position of the third moveable member and the first position of the first moveable member to allow fluid to pass from the inlet of the first chamber to the outlet of the first chamber;
a first fluid line configured to provide compressor bleed air from a compressor to ambient via the first chamber;
the valve system disposed in the first chamber of the first fluid line to selectively control a flow of the bleed air to ambient based on a position of the first, second, and third moveable members; and
a second fluid line selectively fluidly connected to the biasing chamber configured to provide a secondary fluid to the biasing chamber in the second position of the second moveable member.

14. The system of claim 13, further comprising an electronically controllable valve disposed in the second fluid line configured to selectively provided fluid to a shuttle chamber of the valve system to move a shuttle valve from a first position to a second position to allow fluid from the second line to enter the biasing chamber.

15. The system of claim 14, wherein the first moveable member, the second moveable member, and the third moveable member are configured to move between respective first and second positions to bias the first moveable member to the first position of the first moveable member regardless of a state of the electronically controllable valve.

16. The system of claim 15, wherein a pressure of the compressor bleed air is dependent on a speed of the engine and wherein a pressure of the secondary fluid is a constant pressure such that movement of the second moveable member is dependent on the pressure of the compressor bleed air against the first biasing member.

17. A system, comprising:
a first moveable member disposed in a first chamber configured to move between a first position and a second position of the first moveable member to allow or prevent fluid from passing from an inlet of the first chamber to an outlet of the first chamber;
a second moveable member disposed in a second chamber configured to move between a first position and a second position of the second moveable member to allow or prevent fluid from entering a biasing chamber, the second chamber fluidly connected to the first chamber;
a first biasing member disposed on a first side of the second moveable member configured to bias the second moveable member to the first position of the second moveable member to prevent fluid from entering the biasing chamber;
a third moveable member disposed in the biasing chamber and operatively connected to the first moveable member via a mechanical linkage, the third moveable member configured to move between a first position and a second position of the third moveable member; and
a second biasing member disposed on a first side of the third moveable member configured to bias the third moveable member to the first position of the third moveable member and the first position of the first moveable member to allow fluid to pass from the inlet of the first chamber to the outlet of the first chamber;
a stabilizer guide disposed at the outlet of the first chamber configured to guide the first moveable member between the first position and the second position of the first moveable member, wherein the stabilizer guide includes a tri-foil guide.

18. The system of claim 17, wherein the mechanical linkage includes a three member cantilevered mechanical linkage.

19. The system of claim 18, wherein three member cantilevered mechanical linkage includes a first link, a second link, and a rocker, wherein a first side of the three member mechanical linkage is mechanically connected to the first moveable member via the first link and a second side of the three member mechanical linkage is mechanically connected to the third moveable member via the second link, wherein the rocker is disposed between the first link and the second link.

* * * * *